United States Patent [19]

Garcia-Mallol

[11] Patent Number: 4,915,061
[45] Date of Patent: Apr. 10, 1990

[54] FLUIDIZED BED REACTOR UTILIZING CHANNEL SEPARATORS

[75] Inventor: Juan A. Garcia-Mallol, Morristown, N.J.

[73] Assignee: Foster Wheeler Energy Corporation, Clinton, N.J.

[21] Appl. No.: 202,642

[22] Filed: Jun. 6, 1988

[51] Int. Cl.[4] .................................................. F22B 1/00
[52] U.S. Cl. ..................................... 122/4 D; 110/245; 110/216
[58] Field of Search ......................... 110/245; 122/4 D

[56] References Cited

U.S. PATENT DOCUMENTS

| | | | |
|---|---|---|---|
| 1,970,109 | 8/1934 | Stratton | 110/28 |
| 2,110,452 | 3/1938 | Moyer | 110/40 |
| 2,232,290 | 2/1941 | Szikla et al. | 48/76 |
| 2,343,895 | 3/1944 | Frisch | 110/165 |
| 2,582,830 | 1/1952 | Hawley | 112/1 |
| 2,994,287 | 8/1961 | Freiday | 110/98 |
| 3,080,855 | 3/1963 | Lewis | 122/4 |
| 3,763,830 | 10/1973 | Robinson et al. | 122/4 |
| 3,893,426 | 7/1975 | Bryers | 122/4 |
| 3,902,462 | 9/1975 | Bryers | 122/4 |
| 4,184,455 | 1/1980 | Talmud et al. | 122/4 |
| 4,253,425 | 3/1981 | Gamble et al. | 122/4 |
| 4,335,662 | 6/1982 | Jones | 110/245 |
| 4,565,139 | 1/1986 | Sage et al. | 110/245 |
| 4,640,201 | 2/1987 | Holmes | 122/4 D |
| 4,699,068 | 10/1987 | Engstrom | 122/4 D |
| 4,712,514 | 12/1987 | Xu-Yi et al. | 122/4 D |
| 4,732,113 | 3/1988 | Engstrom | 110/245 |
| 4,755,134 | 7/1988 | Engstrom et al. | 122/4 D |

Primary Examiner—Henry C. Yuen
Attorney, Agent, or Firm—Marvin A. Naigur; Warren B. Kice

[57] ABSTRACT

A reactor in which a furnace section and a heat recovery section are formed in a vessel. A bed of solid particulate material including fuel is supported in furnace section and air is introduced into the bed at a velocity sufficient to fluidize same and support the combustion or gasification of the fuel. A mixture of air, the gaseous products of combustion, and the particulate material entrained by the air and the gaseous products of combustion are saturated with the particulate material and directed to the heat recovery section, and a plurality of channel beams are disposed in the heat recovery section for separating the particulate material from the mixture. A trough extends between the furnace section and the heat recovery section for receiving the separated particulate material from the channel beams, and the trough is connected to the furnace section for returning the separated particulate material back to the bed.

7 Claims, 1 Drawing Sheet

FLUIDIZED BED REACTOR UTILIZING CHANNEL SEPARATORS

BACKGROUND OF THE INVENTION

This invention relates to a fluidized bed reactor, and, more particularly, to such a reactor in which heat is generated by the combustion of fuel in a fluidized bed.

Fluidized bed reactors, combustors, or gasifiers, are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxides emissions and fuel flexibility.

The most typical fluidized bed combustion system is commonly referred to as a bubbling fluidized bed in which a bed of particulate materials is supported by an air distribution plate, to which combustion-supporting air is introduced through a plurality of perforations in the plate, causing the material to expand and take on a suspended, or fluidized, state. In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn-down afforded by the bubbling bed, a fluidized bed reactor has been developed utilizing a fast, or circulating, fluidized bed. According to this technique, fluidized bed densities between 5% and 20% volume of solids are attained which is well below the 30% volume of solids typical of the bubbling fluidized bed. The formation of the low density circulating fluidized bed is due to its small particle size and to a high solids throughput, which requires high solids recycle. The velocity range of a circulating fluidized bed is between the solids terminal, or free fall, velocity and a velocity which is a function of the throughput, beyond which the bed would be converted into a pneumatic transport line.

The high solids circulation required by the circulating fluidized bed makes it insensitive to fuel heat release patterns, thus minimizing the variation of the temperature within the combustor or gasifier, and therefore decreasing the nitrogen oxides formation. Also, the high solids loading improves the efficiency of the mechanical device used to separate the gas from the solids for solids recycle. The resulting increase in sulfur adsorbent and fuel residence times reduces the adsorbent and fuel consumption. Furthermore, the circulating fluidized bed inherently has more turndown than the bubbling fluidized bed.

However, the bubbling fluidized bed reactor and especially the circulating fluidized bed reactor require relatively large cyclone separators, which negates the possibility of a compact design which can be modularized and easily transported and erected. This is a major disadvantage especially when the fluidized bed is utilized as a steam generator. Also, the particulate fuel and adsorbent material used in a circulating fluidized bed process must be relatively fine therefore requiring further crushing and drying of the particulate material, which is expensive. Further, the bed height required for adequate adsorption of the sulfur is greater than that in a conventional bubbling fluidized bed system, which further adds to the capital expense and operating costs.

SUMMARY OF THE INVENTION

It is therefore an object of the present invention to provide a fluidized bed reactor which is relatively compact in size, can be modularized and is relatively easy to erect.

It is a still further object of the present invention to provide a reactor of the above type in which a wide range of fuel and adsorption particle size can be utilized.

It is a still further object of the present invention to provide a reactor of the above type in which adequate adsorption is achieved with a reduced bed height.

It is a still further object of the present invention to provide a reactor of the above type in which a gas column is formed in the fluidized bed boiler which is saturated with particulate material.

It is a still further object of the present invention to provide a reactor of the above type in which the particulate material in the gas column is collected and essentially the same amount returned to the fluidized bed to maintain the saturated gas column.

It is a still further object of the present invention to provide a reactor of the above type in which the volume of solids contained in the boiler furnace is relatively high, compared to that of a bubbling fluidized bed.

It is a still further object of the present invention to provide a reactor of the above type in which the temperature of the fluidized bed is varied by varying the amount of air introduced into the bed.

It is a still further object of the present invention to provide a reactor of the above type in which cooling surfaces are provided in contact with the bed and the gas column.

It is a still further object of the present invention to provide a reactor of the above type which incorporates operating principles and advantages of both the bubbling fluidized bed and the fast fluidized bed.

It is a still further object of the present invention to provide a reactor of the above type in which the conventional cyclone separator is replaced by a channel separating system.

It is a still further object of the present invention to provide a reactor of the above type which is utilized to generate steam.

Toward the fulfillment of these and other objects, the fluidized bed reactor of the present invention includes a furnace section and a heat recovery section formed in a vessel. A bed of solid particulate material including fuel is supported in the furnace section and air is introduced into the bed at a velocity sufficient to fluidize same and support the combustion or gasification of said fuel. A mixture of air, the gaseous products of said combustion, and the particulate material entrained by the air is directed through a plurality of spaced channel beams disposed in the heat recovery section for separating the particulate material from said mixture. A trough extends between the furnace section and the heat recovery section for receiving the separated particulate material from the channel beams, and the trough is connected to the furnace section for returning the separated particulate material back to the bed.

BRIEF DESCRIPTION OF THE DRAWINGS

The above brief description as well as further objects, features and advantages of the reactor of the present invention will be more fully appreciated by reference to the following detailed description of presently preferred but nonetheless illustrative embodiments in accordance with the present invention when taken in conjunction with the accompanying drawing in which.

DESCRIPTION OF THE PREFERRED EMBODIMENT

Figure 1:
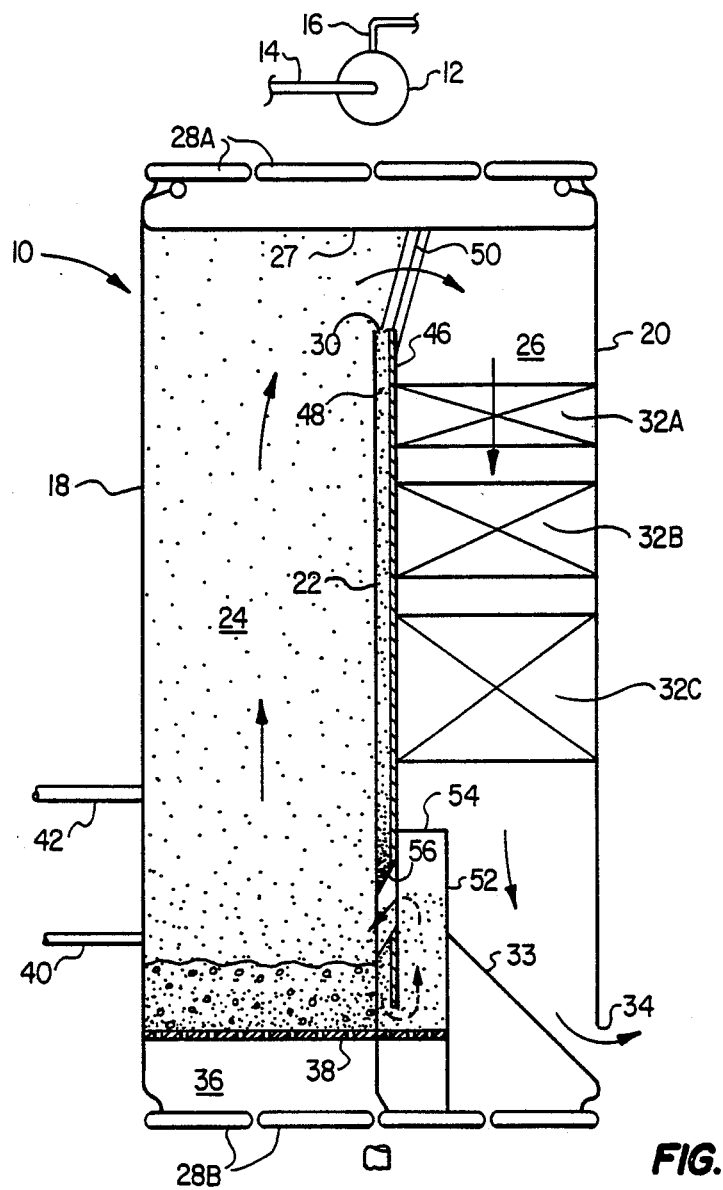
FIG. 1 is a schematic view depicting the fluidized bed reactor of the present invention.

The fluidized bed reactor of the present invention is shown by the reference numeral 10 in FIG. 1 of the drawings, and forms a portion of a steam generator including a steam drum 12 which receives water from a feed pipe 14 and discharges the steam generated via a plurality of steam pipes 16.

The reactor 10 is disposed below the steam drum 12 and includes a vessel defined by a front wall 18, a spaced, parallel rear wall 20 and an intermediate wall 22 extending between the walls 18 and 20 in a spaced parallel relation thereto. It is understood that two spaced sidewalls (not shown) extend perpendicular to the front and rear walls to form a substantially rectangular vessel. The walls 18 and 22, along with corresponding portions of the sidewalls, form a furnace section 24 and the walls 20 and 22, along with corresponding portions of the sidewalls, form a heat recovery section 26.

A roof 27 extends from the wall 18 to the wall 20 and it, along with the walls 18, 20 and 22 are each formed by a plurality of vertically-disposed tubes interconnected by vertically-disposed elongated bars, or fins, to form a contiguous, air-tight structure. Since this type of structure is conventional, it is not shown in the drawings nor will it be described in any further detail. The ends of each of the tubes of the walls 18, 20, and 22 are connected to horizontally-disposed upper and lower headers 28A and 28B, respectively, for reasons that will be explained.

An opening 30 is formed in the upper portion of the intermediate wall 22 to communicate the upper portion of the furnace section 24 with the heat recovery section 26.

A plurality of tube banks 32A, 32B and 32C are disposed in the heat recovery section, and each tube bank consists of a plurality of tubes connected in a flow circuitry for passing steam or water through the tubes to remove heat from the gases. Since these tube banks and their associated circuitry are conventional, they will not be described in any further detail. An angularly-extending baffle 33 is disposed in the lower portion of the heat recovery section 26 for directing gases towards an outlet opening 34 formed through the lower portion of the wall 20, for reasons to be described.

Although not shown in the drawings, it is understood that water flow circuitry, including the feed pipe 14, is provided to connect the steam drum 12 to the headers 28A and 28B to form a flow circuit for the water and steam through the steam drum 12 and the walls 18, 20 and 22. Since this is a conventional technique it will not be described any further.

A plenum chamber 36 is disposed at the lower portion of the furnace section 24 into which pressurized air from a suitable source (not shown) is introduced by conventional means, such as a forced-draft blower, or the like.

A perforated air distribution plate 38 is suitably supported at the lower portion of the furnace section and above the plenum chamber 36. The air introduced through the plenum chamber 36 passes in an upwardly direction through the air distribution plate 38 and may be preheated by air preheaters (not shown) and appropriately regulated by air control dampers as needed. The air distribution plate 38 is adapted to support a bed of a particulate material consisting, in general, of crushed coal and limestone, or dolomite, for adsorbing the sulfur formed during the combustion of the coal. The plate 38 extends into a portion of the heat recovery section 26 for reasons to be described.

A fuel distributor pipe 40 extends through the front wall 18 for introducing particulate fuel into the furnace section 24, it being understood that other pipes can be associated with the walls 18, 20 and 22 for distributing particulate sorbent material and/or additional particulate fuel material into the furnace section as needed. It is understood that a drain pipe (not shown) registers with an opening in the air distribution plate 38 and extends through the plenum chamber 36 for discharging spent fuel and sorbent material from the furnace 24 to external equipment.

An air pipe 42 is provided through the front wall 18 at a predetermined elevation from the plate 38 to introduce secondary air into the furnace section 24 for reasons to be described. It is understood that a plurality of air ports (not shown) at one or more elevations can be provided through the wall 18 and any of the other walls defining the furnace section 24 for discharging the air from the pipe 42 into the furnace section.

According to a feature of the present invention, a wall 46 is provided adjacent to, and parallel with, the intermediate wall 22 to define, together with the latter wall, a trough 48 extending from the upper portion of the heat recovery section 26 to an area just above the extended distribution plate 38.

Figure 2:
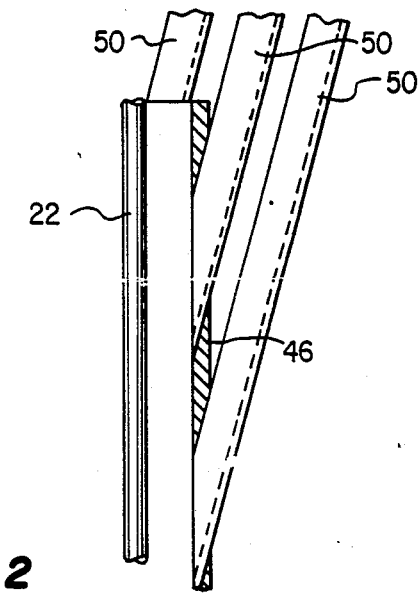
FIG. 2 is a partial enlarged view of a portion of the reactor of FIG. 1.

A plurality of channel beams 50 extend at an angle from the upper portion of the trough 48 to the roof 27. As better shown in FIG. 2, the channel beams 50 are disposed in three rows and, although not clear from the drawings, each row is formed by a plurality of channel beams extending in a slightly spaced relationship, with the middle row being offset from the remaining rows to form relatively small passages therebetween. The beams 50 are substantially U-shaped in cross-section and, as such, will collect dust or entrained particulate material from the gases passing from the furnace section 24 to the heat recovery section 26, as will be described.

A vertical wall 52 and a horizontal wall 54 extend adjacent the lower portion of the wall 46 and define, together with the latter wall and the extended portion of the plate 38, an enclosure. A short tube 56 extends between the walls 22 and 46 and registers at each end with openings extending through the walls. Thus, a passage is formed which connects the trough 48 with the furnace section 24.

In operation, a particulate material, including coal, is provided on the plate 38 and is fired while air is introduced into the plenum chamber 36. Additional coal is introduced through the distributor pipe 40 into the interior of the furnace section as needed, and the coal is ignited by burners (not shown) positioned within the bed. As the combustion of the coal progresses, additional air is introduced into the plenum chamber 36 in quantities that comprise a fraction of the total air required for complete combustion so that the combustion in the lower portion of the furnace section 24 is incomplete. The latter section thus operates under reducing conditions and the remaining air required for complete combustion is supplied by the air pipe 42. The range of air supplied through the plenum chamber 36 can be from 40% to 90% of that required for complete combustion, while the remaining air (60% to 10%) is supplied through the pipe 42.

The high-pressure, high velocity, combustion-supporting air introduced through the air distribution plate 38 from the plenum chamber 36 is at a velocity which is greater than the free fall velocity of the relatively fine particles in the bed and less than the free fall velocity of the relatively coarse particles. Thus, a portion of the fine particles become entrained within, and are pneumatically transported by, air and the combustion gases. This mixture of entrained particles and gases rises upwardly within the furnace section 24 to form a gas column containing the entrained particles which passes from the furnace section 24, through the opening 30 and into the heat recovery section 26. In so passing, a great majority of the particles impinge against the channel beams 50 to separate them from the gas which passes on through the spaces between the beams. The separated particles slide down the beams 50 and into the trough 48 and pass, by gravity, downwardly in the trough, around the tube 56 and exit from the bottom end of the trough 35 and into the enclosure defined by the walls 46, 52, and 54 and the extended plate 38. The particles build up in the latter enclosure until the level exceeds that of the tube 56, at which time the particles begin to overflow through the tube and into the furnace section 24. This permits a constant flow of the recycled particles into the furnace section 24 while sealing against back flow of the high pressure gases from the furnace section into the enclosure defined by the walls 46, 52 and 54 and the plate 38.

Additional particles are added through the pipe 40 in quantities sufficient to saturate the gases in the upper portion of the furnace section 24 with the particles, i.e., maximum entrainment of the particles by the gas is attained. As a result of the saturation, the relatively coarse particles, along with a portion of the relatively fine particles are retained in the lower portion of the furnace section 24 which thus contains a relatively high percentage volume of particles, such as 20% to 30% of the total volume, when operating at maximum capacity.

The remaining portion of the fine particles passes upwardly through the gas column and exits through the opening 30, before being separated from the gases and recycled back to the furnace section 24 as described above. This, plus the introduction of additional particulate fuel material through the distributor pipe 40 maintains the saturated gas column in the furnace section 24.

Water is introduced into the steam drum 12 through the water feed pipe 14 and is conducted downwardly through downcomers or the like, into the lower headers 28B and the tubes forming the walls 18, 20 and 22 and the roof 27, as described above. Heat from the fluidized bed, the gas column, and the transported solids converts a portion of the water into steam, and the mixture of water and steam rises in the tubes, collects in the upper headers 28A, and is transferred to the steam drum 12. The steam and water are separated within the steam drum 12 in a conventional manner, and the separated steam is passed from the steam drum by the steam pipes 16 to a steam turbine, or the like. The separated water is mixed with the fresh supply of water from the feed pipe 14, and is recirculated through the flow circuitry in the manner just described. Other cooling surfaces, preferably in the form of partition walls with essentially vertical tubes, can be utilized in the furnace 24.

The hot clean gases passing through the channel beams 50 enter the heat recovery section 26 and pass over the tube banks 32A, 32B and 32C to remove additional heat from the gases and add heat to the steam or water flowing through the latter tubes. The gases are then directed by the baffle 33 towards the outlet opening 34 and exit from the heat recovery section 26. If the air which is introduced into the plenum chamber 36 is at a relatively high pressure on the order of 10 atmospheres, the gases from the outlet opening 34 may be directed to a gas turbine, or the like (not shown).

In response to changes in load of the steam turbine, the temperature of the bed 24 is maintained at a preset acceptable value by changing the amount of air supplied to the boiler via the plenum chamber 36 and the air pipe 42.

It is thus seen that the reactor of the present invention provide several advantages. For example, the provision of the channel beams 50 and the trough 48 permits the separation of the entrained particles and the recycling of same back to the furnace section 24 while eliminating the need for relatively bulky and expensive cyclone separators. Thus, the reactor of the present invention is relatively compact and can be fabricated into modules for easy transportation and fast erection, which is especially advantageous when the reactor is used as a steam generator, as disclosed. Also the reactor of the present invention operates in a manner to benefit from the advantages of both a bubbling fluidized bed and a circulating fluidized bed. For example, the relatively high amount of lateral mixing of the particulate materials within the fluidized bed is similar to the mixing attained by the bubbling fluidized bed. In addition, the fine particles are retained in the reacting zone, as in the case of a circulating fluidized bed, and fuel and adsorbent having a wider range of particle size can be utilized. Also, a smaller static bed height and much smaller expanded bed height than those of the circulating fluidized bed are possible. This, in conjunction with the overfire air discharging above the fluidized bed, results in a smaller power requirement for the air fans and less important mechanical forces due to bed pressure variations. Further, the majority of the reactions between solids and gases, including the combustion in particular, occur only below the overfire air ports, therefore minimizing carbon monoxide and hydrocarbon emissions. Also, in conjunction with the preceding advantage, staging of the air with an overfire air fraction reduces the nitrogen oxides emissions. In addition, the use of refractory material, preferably of the high conductivitY type, is possible below the overfire air, where the surfaces face reducing gases, and in erosion-prone locations elsewhere. Further, no active control of the solids circulation rate of flow by the solids recycle system is necessary, because the continuous maintenance of the saturated gas column limits the solids circulation. Also, by providing for extraction of relatively small amounts of the particulate solids from the recycle system, as well as the fluidized bed tap, the residence time of the coarse and fine particulate solids in the system can be adjusted to suit their reacting characteristics.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the scope of the invention. For example, the fuel supplied to the furnace section 24 can be in liquid or gaseous form rather than in the particulate solid form as described. Of course, other variations can be made by those skilled in the art without departing from the invention as defined the appended claims.

What is claimed is:

1. A reactor comprising a vessel; means for forming a furnace section and a heat recovery section in said vessel; means in said furnace section for supporting a bed of solid particulate material including fuel; means for introducing air into said bed at a velocity sufficient to fluidize same and support the combustion or gasification of said fuel; means for directing to said heat recovery section a mixture of said air, the gaseous products of said combustion, and the particulate material entrained by said air and said gaseous products of combustion; a plurality of channel beams disposed in said heat recovery section for separating the particulate material from said mixture; a trough registering with said channel beams and extending between said furnace section and said heat recovery section for receiving the separated particulate material from said channel beams; an enclosure extending in said heat recovery section and registering with said trough to receive said separated particulate material, said enclosure extending over said means for supporting a bed of solid particulate material whereby said separated particulate material is fluidized by said means for introducing air into said bed whereby said separated particulate material builds up in said enclosure; and means connecting said enclosure to said furnace section for returning the separated particulate material back to said bed after said separated particulate material reaches a predetermined level in said enclosure.

2. The reactor of claim 1 further comprising means for adding additional particulate material to said bed in quantities sufficient to maintain the entrainable particulate material in said bed and in said mixture and to saturate said mixture with said particulate material.

3. The reactor of claim 2 wherein said adding means adds additional particulate material to said bed in quantities sufficient to maintain relatively coarse particles and relatively fine particles in said bed, and relatively fine particles in said column.

4. The reactor of claim 1 wherein said means for forming said furnace section and said heat recovery section comprises a vertical partition extending through said vessel.

5. The reactor of claim 4 further comprising a wall extending in a spaced parallel relation to said partition to form said trough.

6. The reactor of claim 5 wherein said connecting means comprises an opening extending through said partition means and said wall and a tube extending between said openings.

7. The reactor of claim 6 wherein said enclosure extends over said openings so that said built up separated particulate material overflows into said tube to seal against backflow of air and gases from said furnace section to said heat recovery section.

* * * * *